(12) United States Patent
Sharma et al.

(10) Patent No.: US 11,086,723 B2
(45) Date of Patent: Aug. 10, 2021

(54) DISTRIBUTED STREAMING PARALLEL DATABASE RESTORES

(71) Applicant: Rubrik, Inc., Palo Alto, CA (US)

(72) Inventors: Venkatesh Kempapura Sharma, Foster City, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 371 days.

(21) Appl. No.: 16/263,413

(22) Filed: Jan. 31, 2019

(65) Prior Publication Data

US 2020/0250044 A1    Aug. 6, 2020

(51) Int. Cl.
*G06F 11/14*    (2006.01)
*G06F 16/27*    (2019.01)
*G06F 9/48*    (2006.01)
*H04L 29/08*    (2006.01)
*G06F 16/182*    (2019.01)

(52) U.S. Cl.
CPC ........ *G06F 11/1448* (2013.01); *G06F 9/4881* (2013.01); *G06F 11/1464* (2013.01); *G06F 16/1834* (2019.01); *G06F 16/278* (2019.01); *H04L 67/1095* (2013.01)

(58) Field of Classification Search
CPC ............ G06F 11/1448; G06F 11/1464; G06F 16/278; G06F 9/4881; G06F 16/1834; G06F 11/1469; G06F 11/3055; G06F 11/301; G06F 11/1484; G06F 11/3442; G06F 11/1451; G06F 11/3006; G06F 11/3409; G06F 9/5072; H04L 67/1095; H04L 67/32; H04L 67/1097
USPC .......................................................... 714/2
See application file for complete search history.

(56) References Cited

U.S. PATENT DOCUMENTS 9,798,584 B1 * 10/2017 Kulkarni ............. G06F 11/1464

* cited by examiner

*Primary Examiner* — Yair Leibovich
(74) *Attorney, Agent, or Firm* — Schwegman Lundberg & Woessner, P.A.

(57) ABSTRACT

A streaming distributed decentralized database task system can perform multiple tasks of parallel jobs on clusters of nodes without overloading the clusters' computational resources, such as disk, memory, processors, and network bandwidth. A cluster master can manage a job and add items to node queues. A node manager accepts or rejects queue items based on streaming task limits that are applied at the node level.

20 Claims, 16 Drawing Sheets

DISTRIBUTED STREAMING PARALLEL DATABASE RESTORES

TECHNICAL FIELD

The present disclosure generally relates to special-purpose machines that manage database processes and improvements to such variants, and to the technologies by which such special-purpose machines become improved compared to other special-purpose machines for performing restores of databases.

BACKGROUND

A distributed database is a data storage system that manages data that is spread over a collection of devices, such as a cluster of virtual machines. Each device in the collection of devices may operate in a similar manner to perform database operations in a robust, fault-tolerant approach. However, while a distributed database can enable robust and quick data storage services, such systems are resource-intensive. For example, it is difficult and often impossible to perform multiple jobs on a collection of devices without consuming large amounts of computational resources.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1A:
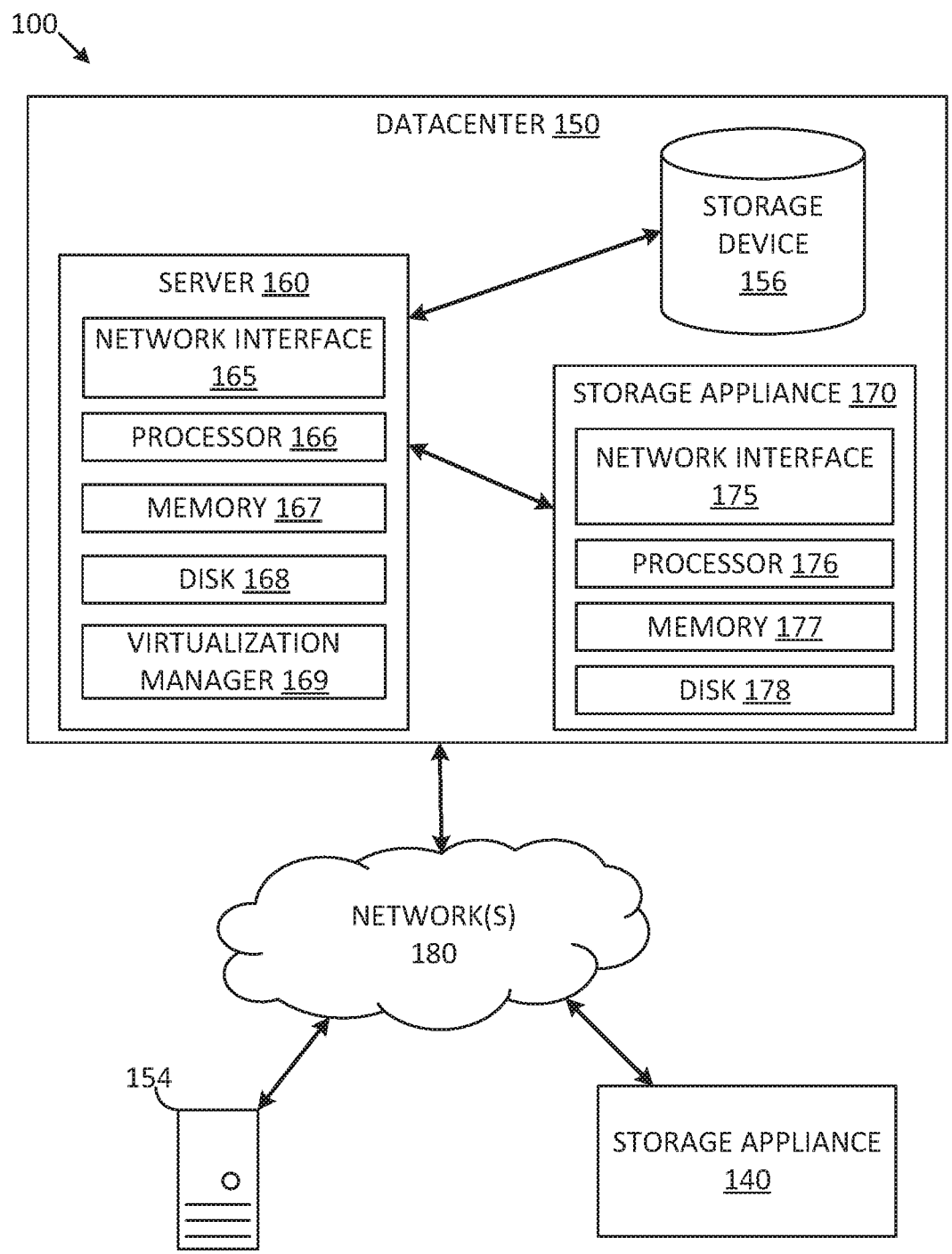
FIG. 1A depicts a networked computing environment in which the disclosed technology may be practiced, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Performing restores in a distributed decentralized database system (e.g., an Apache Cassandra cluster having a dataset partitioned/sharded across different nodes) is difficult because the state of nodes in the cluster can rapidly change, e.g., nodes go down temporarily, nodes are added, nodes permanently are removed the cluster, etc. Ideally, a restore job in such a dynamic system should be performed quickly. However, performing the restore quickly may overload the cluster, because the nodes have finite processor power, memory, disk space, and network bandwidth. Conventional restore operations are memory intensive. For example, some conventional restore operations require that the target node have double the memory of the data to be restored (e.g., if 2 GB are to be stored, the target node should have at least 4 GB available), which may not be available on a given system. These issues compound when a cluster performs two separate restore jobs in parallel as each additional restore job may involve a dynamic group of nodes with different states, and each restore job may further have its own unique resource requirements. Thus, multiple parallel restores are difficult and impractical to perform in large distributed database systems with dynamic node cluster conditions.

To this end, a distributed streaming database system can be implemented to manage multiple cluster restores in parallel by using a cluster master that governs independent node managers on each node for a restore job. In some example embodiments, upon a restore job being initiated, one of the nodes is elected as a cluster master via an election process. The cluster master monitors the states of node manager instances running on each node of the cluster. The node managers all operate independently from each other in that they do not require information from each other and there is no shared state between them, according to some example embodiments. Each node manager performs a restore task for data controlled/managed by the shard on that given node. Each node manager is assigned a queue that receives tasks from the cluster master to complete the cluster job, e.g., a restore job. In some example embodiments, a given node manager has a many-to-one relationship with other entities in the network (e.g., cluster masters), such that a given node may perform simultaneous restore operations for multiple restore processes. As individual restore file tasks (e.g., restore tasks from a single restore job, restore tasks from two different restore jobs) from the queue are completed, the node managers report back to the cluster master so that the cluster master maintains a state of the restore jobs being performed in the cluster, according to some example embodiments.

In some example embodiments, each node manager has a load limit, where load can be defined as max CPU level, max disk level, max memory level, or max bandwidth level for that node before tasks are rejected or delayed. When a node manager for a given node receives a task to perform, it checks its own load level: if the load level is exceeded the node manager rejects the task; whereas, if the node is under its load level it performs the restore task.

Tasks that are rejected by one node are sent to another node for completion via the cluster master, which manages node membership for the cluster, and further tracks which of the nodes a replicant that can perform the rejected restore task. The queue can be modified to be larger or smaller: making a queue larger will increase the acceptable load limit for a given node, while making the queue size smaller will decrease the acceptable load limit for that node. In this way, by applying limits analyzed at the node level, the system can perform streaming of file tasks (e.g., restore tasks) on a cluster of nodes without overloading nodes. For example, whereas conventionally a cluster may not be able to perform a restore job due to the large disk space requirements, the streaming limits (e.g., node level limits) allow a restore job to be completed in a streaming manner: the load for each node never surpasses the pre-specified limit, and files tasks are held in queue, requeued, delayed, or rerouted to other nodes to ensure the streaming task limit is not exceeded.

In some example embodiments, the load on a given node can be affected by the size of the data to be restored and/or restore job complexity (e.g., query-able restores in which only a select set of files are to be restored), and also external factors such as other computational processes being performed on the cluster (e.g., other restore jobs, other non-restore-related computational processes, such as servicing end-user devices or external network service requests).

In some example embodiments, the node manager does not analyze the complexity or attributes of a task in the queue, but instead accepts or rejects the task based on the load of the node being below a pre-specified threshold. For example, a node manager can reject a task in a queue because the processor of the node is over a prespecified limit, with no consideration of whether the task in the queue can be performed quickly or with minimal resources.

In contrast to conventional approaches in which a cluster performs a single task (e.g., a cluster performing a MapReduce wordcount job), the distributed streaming restore system can perform multiple computational tasks (e.g., restores) on the same cluster in parallel without overloading the nodes. This is possible at least in part by via node managers being able to independently throttle and reject tasks. Further, by applying local logic at the node-level, the distributed streaming database system can efficiently scale to handle large numbers of cluster jobs in parallel without sacrificing performance.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a work station, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server 160 or to perform a search query related to particular information stored on the server 160. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer-readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at a point in time is frozen) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual-machine-related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center 150. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point-in-time versions of one or more virtual machines running within the data center 150. A snapshot of a virtual machine may correspond with a state of the virtual machine at a particular point in time. In response to a restore command from the server 160, the storage appliance 170 may restore a point-in-time version of a virtual machine or restore point-in-time versions of one or more files located on the virtual machine and transmit the restored data to the server 160. In response to a mount command from the server 160, the storage appliance 170 may allow a point-in-time version of a virtual machine to be mounted and allow the server 160 to read and/or modify data associated with the point-in-time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 1B:
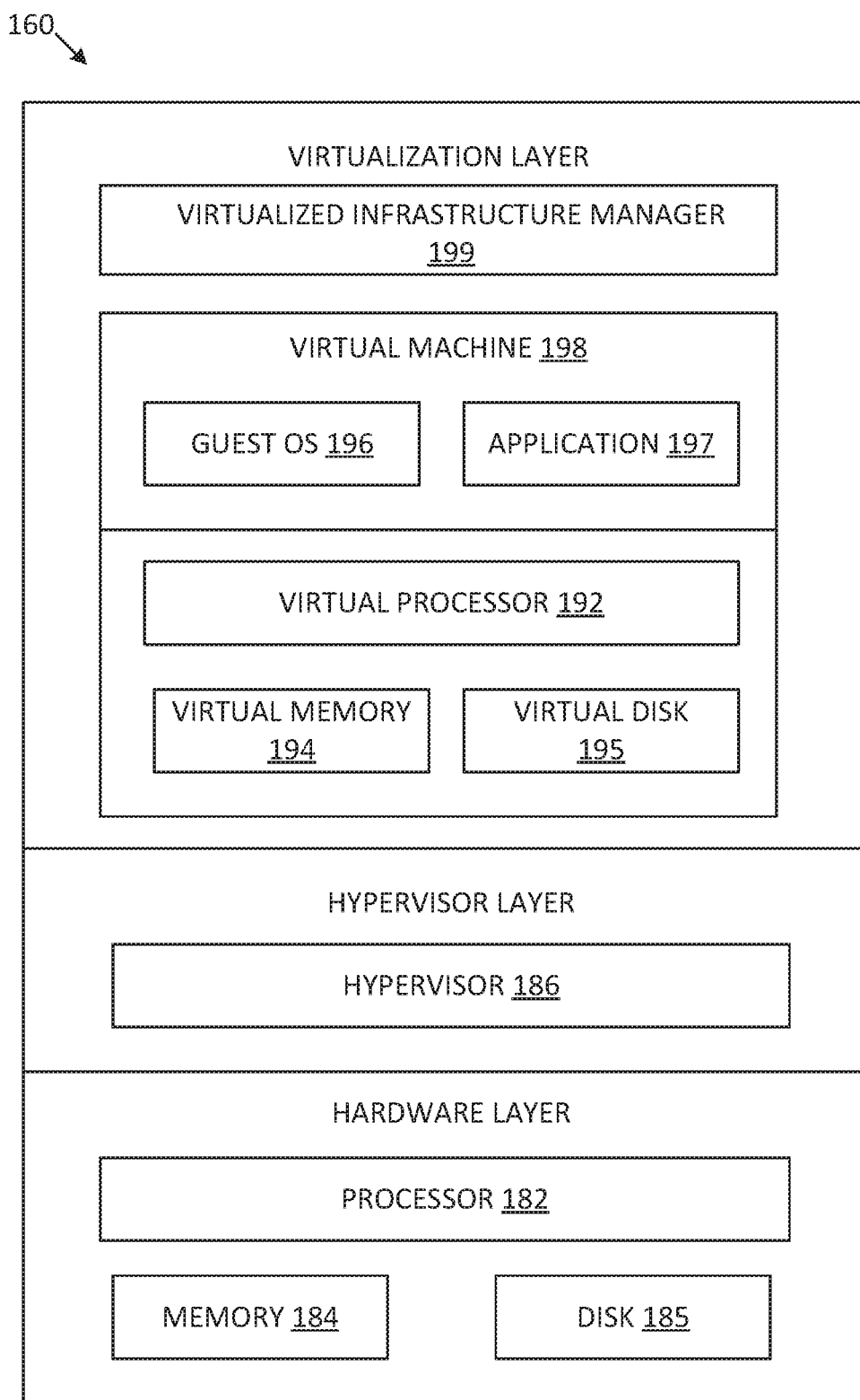
FIG. 1B depicts a server of a networked computing environment, according to some example embodiments.

FIG. 1B depicts one embodiment of server 160 in FIG. 1A. The server 160 may comprise one server out of a plurality of servers that are networked together within a data center. In one example, the plurality of servers may be positioned within one or more server racks within the data center 150. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure-related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server 160. The distributed file system protocol may allow the server 160 or the hypervisor 186 to mount a directory or a portion of a file system located within the storage appliance 140, 170.

Figure 1C:
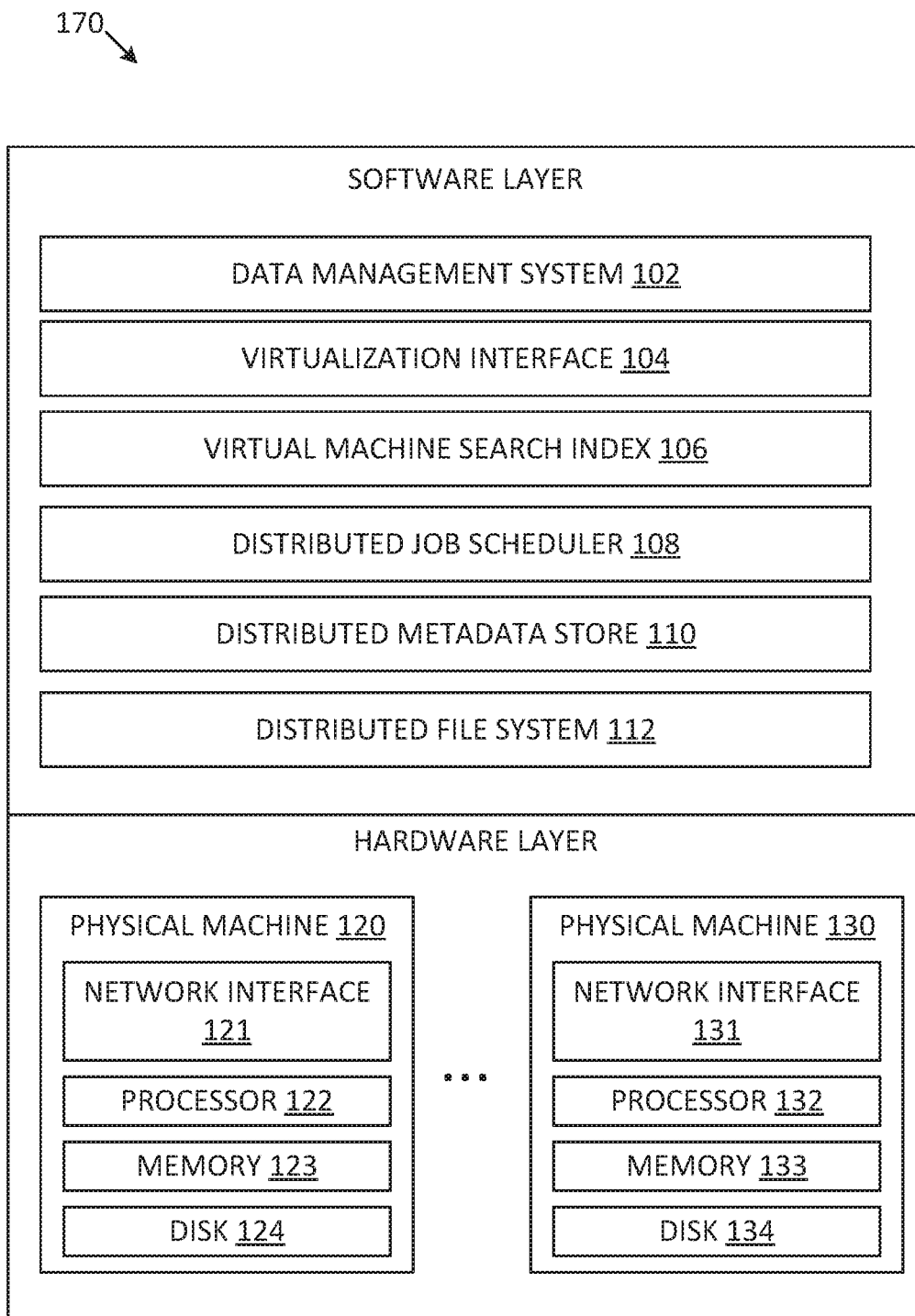
FIG. 1C depicts a storage appliance of a networked computing environment, according to some example embodiments.

FIG. 1C depicts one embodiment of storage appliance 170 in FIG. 1A. The storage appliance 170 may include a plurality of physical machines that may be grouped together and presented as a single computing system. Each physical machine of the plurality of physical machines may comprise a node in a cluster (e.g., a failover cluster, a Cassandra cluster). In one example, the storage appliance 170 may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer-readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B, may be configured with a first floating IP address associated with a first node in the cluster. The hypervisor 186 may connect to the cluster using the first floating IP address. In one example, the hypervisor 186 may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor 186 for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-shots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system 112 for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault-tolerant distributed file system 112. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault-tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure.

The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance (e.g., storage appliance 170) that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
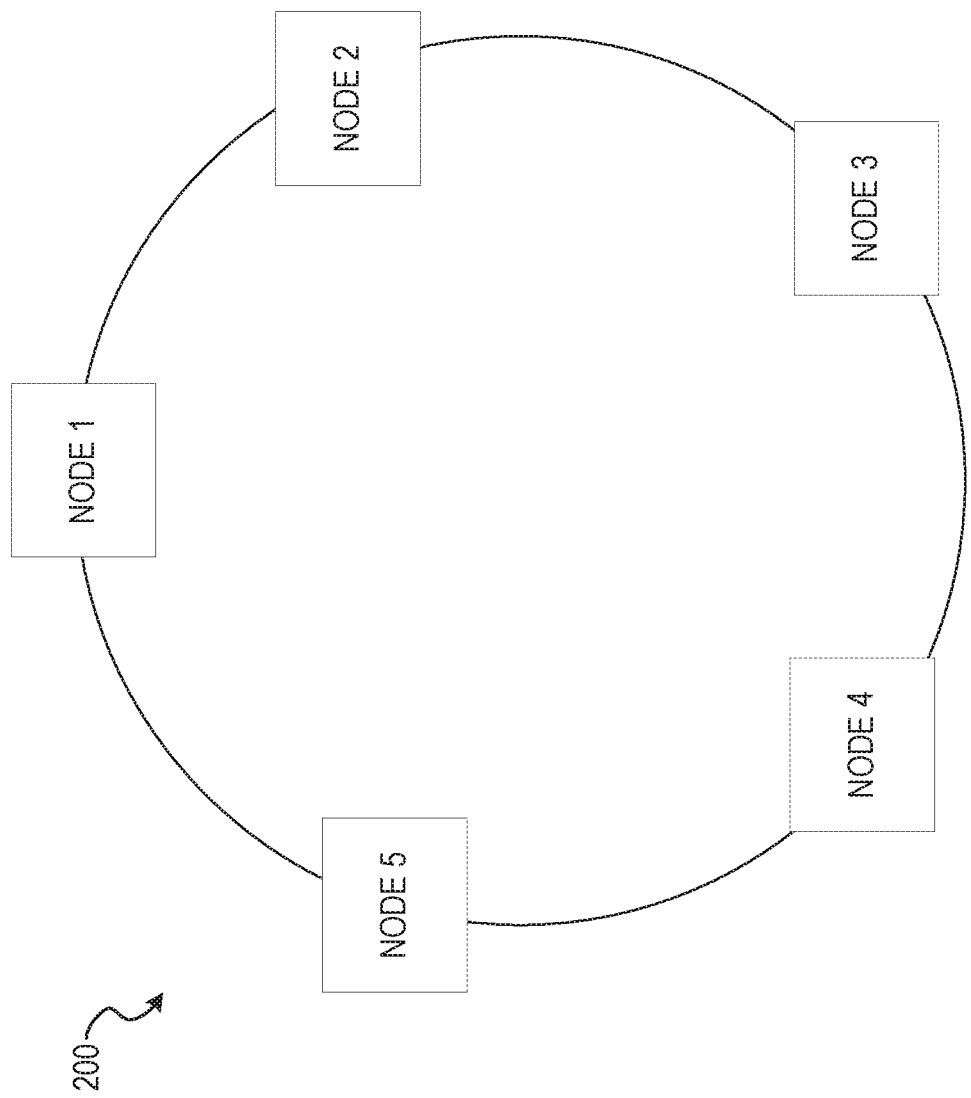
FIG. 2 shows an example cluster of a distributed decentralized database, according to some example embodiments.

FIG. 2 shows an example cluster 200 of a distributed decentralized database management system, according to some example embodiments. As illustrated, the example cluster 200 includes five nodes, nodes 1-5. In some example embodiments, each of the five nodes runs from different machines, such as physical machine 120 in FIG. 1C or virtual machine 198 in FIG. 1B. The nodes in the cluster 200 can include instances of peer nodes of a distributed database system (e.g., distributed decentralized database management system, a NoSQL system, Apache Cassandra, DataStax, MongoDB), according to some example embodiments. The distributed database system is distributed in that data is sharded or distributed across the cluster 200 in shards or chunks, and decentralized in that there is no central storage device and there no single point of failure. The system operates under an assumption that multiple nodes may go down, up, or become non-responsive, and so-on. Sharding is splitting up of the data horizontally and managing each separately on different nodes. For example, if the data managed by the cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the cluster 200. For example, data written to node 1 can be replicated to nodes 2 and 3. If node 1 prematurely terminates, node 2 and/or 3 can be used to provide the replicated data. In some example embodiments, each node of cluster 200 frequently exchanges state information about itself and other nodes across the cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the cluster 200.

Reading: Any node of cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of cluster 200 are configured to function the same way (e.g., as symmetrical peer database nodes that communicate via gossip protocol, such as Cassandra nodes) with no single point of failure. If one of the nodes in cluster 200 terminates prematurely ("goes down"), another node can rapidly take the place of the terminated node without disrupting service. The cluster 200 can be a container for a keyspace, which is a container for data in the distributed decentralized database system (e.g., whereas a database is a container for containers in conventional relational databases, the Cassandra keyspace is a container for a Cassandra database system).

Figure 3:
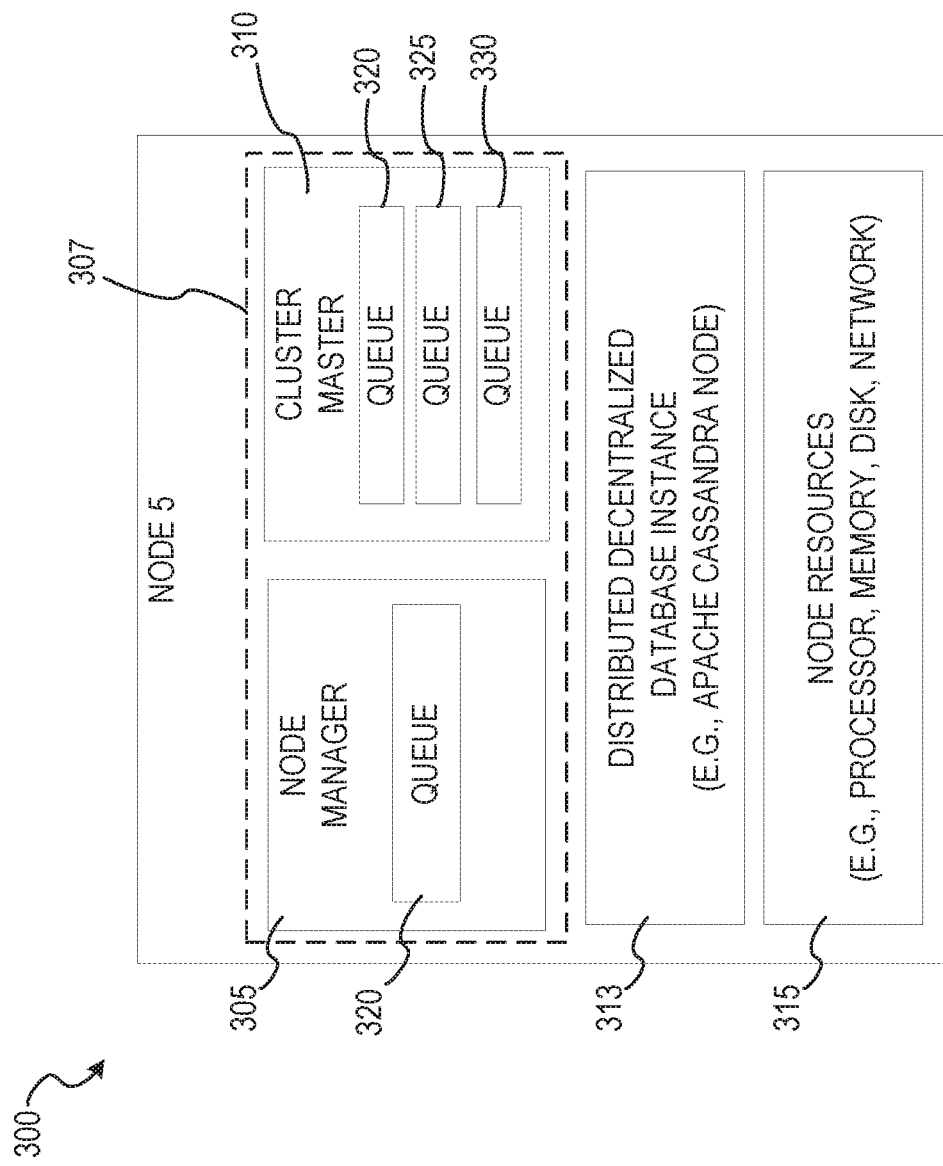
FIG. 3 shows an example internal architecture of a node of a cluster, according to some example embodiments.

FIG. 3 shows an example internal architecture 300 of node 5 of the cluster 200, according to some example embodiments. Node 5 can be hosted from a virtual machine or physical machine (e.g., physical machine 120, FIG. 1C). Node resources 315 of node 5 are the computational resources of the machine upon which node 5 is installed. For example, if node 5 is hosted from physical machine 120, then node resources 315 can include network interface 121, processor 122, memory 123, and disk 124. If node 5 is hosted from virtual machine 198, then the node resources 315 can include virtual memory 194, virtual disk 195, and virtual processor 192, and further include the underlying physical resources (e.g., the physical processor, physical disk, and so on). In some example embodiments, the node manager checks the VM disk usage and the underlying physical disk usage (if access is granted to the node manager by the host OS) to determine whether a load level is exceeded (e.g., disk load level is exceeded). The peer database instance 313 is an instance of a distributed database cluster (e.g., an Apache Cassandra instance). The peer database instance 313 functions in concert with other peer database instances of the other nodes in a cluster, such as cluster 200.

Node 5 further comprises a streaming instance 307 (e.g., streaming restore application) of a distributed streaming restore system. The streaming instance 307 can include a node manager 305 and a cluster master 310. The node manager 305 manages all traffic for node 5 (or the shard managed by node 5) for tasks processed by the cluster 200. For example, traffic for a first restore job and traffic for a second restore job (e.g., traffic to node 5 across all column families and keyspaces) are routed to the node manager 305 for processing. The node manager 305 is configured to provision as many tasks as possible to complete the restore job while staying under the load limit for node 5, as discussed in further detail with reference to FIG. 7. In some example embodiments, a queue 320 is used to track file restore tasks for node 5. For example, the node manager 305 may identify a task for a restore job from the queue 320 and determine the usage levels of the node resources 315 (e.g., physical CPU load level, VM CPU load level, memory usage, network usage, disk usage). The node manager 305 can then perform or reject the task based on whether the usage levels surpass the load limit, as discussed in further detail below. Further, the node manager 305 is configured to track the health of node 5 (e.g., usage, load) and the health of peer database instance 313. For example, the node manager 305 can function as an agent or listener in node 5 that listens to information provided by the peer database instance 313 (e.g., requests information from an API of the peer database instance 313). If a distributed decentralized database instance (e.g., Cassandra node) terminates or is otherwise non-responsive, the node manager 305 can notify the cluster master 310 via a sync operation as discussed below.

The queue 320 can be stored in the node manager 305, the cluster master 310, or both the node manager 305 and the cluster master 310, as illustrated in the example embodiment of FIG. 3. The cluster master 310 can store additional queues of different nodes. For example, queue 325 can store file restore tasks to be performed by node 2, and queue 330 can store file restore tasks to be performed by node 3, and so on.

The cluster master 310 keeps track of node manager membership of the cluster 200 and further manages which node managers perform which file restore tasks for a given restore job. In some example embodiments, upon a restore job being initiated for a distributed decentralized database running in cluster 200, one of the streaming restore nodes is elected as a cluster master. In the example of FIG. 3, the streaming instance 307 of node 5 has been elected to be the cluster master; thus cluster master 310 is instantiated on node 5.

In some example embodiments, cluster master election is a leader election process in which the node with a specified attribute is elected as the cluster master (e.g., via Apache Zookeeper election). For example, if the role of cluster master is not locked, all streaming restore nodes attempt to take a lock (e.g., znode lock) for cluster master, and the first one that takes the lock is the new cluster master. In some example embodiments, each node in the cluster has an index or tag and the node with the highest tag is elected as the cluster master. For example, node 1 has a tag of 1, node 2 has a tag of 2, and so on, where node 5 is elected as the cluster master and node 4 is selected as the new cluster master should node 5 prematurely terminate. After cluster master election, the node managers then receive file tasks in respective queues for one or more restore jobs.

In some example embodiments, the node manager 305 and cluster master 310 are run as applications external to the peer database instance 313. For example, if node 5 is hosted on a virtual machine, the node manager 305 and cluster master 310 can be implemented as a standalone application that runs on the OS inside the VM, a Java servlet, or a microthread (e.g., Python tasklet, greenlet). In some example embodiments, the node manager 305 and cluster master 310 are integrated into the peer database instance 313 as plugins. Further, in some example embodiments, the cluster master 310 and/or the node manager 305 are hosted from separate machines. For example, the node manager 305 can be hosted form an external machine separate from node 5 and perform local load level reasoning via an API interface to node 5 or the peer database instance 313.

Figure 4:
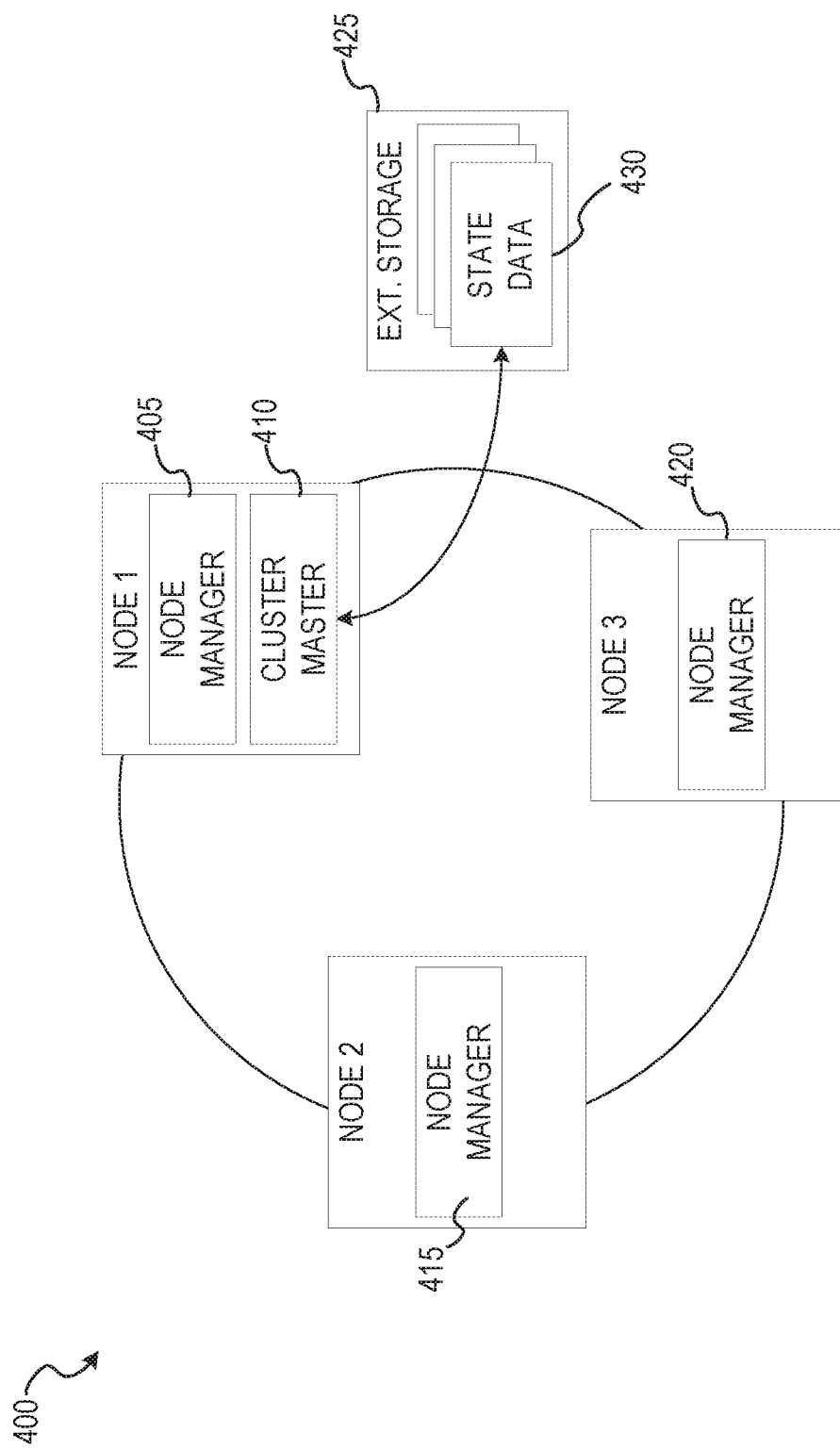
FIG. 4 shows an example cluster performing streaming restore operations, according to some example embodiments.

FIG. 4 shows an example cluster 400 performing streaming restore, according to some example embodiments. In the example of FIG. 4, only the components of the streaming instances (e.g., node managers, cluster masters) are illustrated in the nodes, and the peer nodes (e.g., peer database instance 313 in FIG. 3) are omitted for clarity, though it is appreciated that each of the nodes can include peer nodes, as discussed. In the example of FIG. 4, a single restore job has been initiated and the file tasks for the restore job are hashed into a consistent ring to share work across all of the nodes in cluster 400, as denoted by the circular ring connecting nodes 1-3. In contrast to the symmetrical database layer which may also be running in the cluster 400, the streaming restore nodes in the example of FIG. 4 are asymmetrical in that the nodes do not have the same tasks and cannot seamlessly take the place of one another. For example, node 1 comprises node manager 405 and cluster master 410, whereas node 2 and node 3 only include node managers, i.e., node manager 415 and 420 respectively.

The complete state for a given restore job (e.g., column family restore) is centralized and managed by the cluster master 410. The cluster master 410 knows the individual state of the node managers 405, 415, 420, whereas each node manager 405, 415, 420 only knows its own state and does not know the state of the other node managers. The cluster master 410 utilizes the complete state information to perform abort, reconfigure, and restart job operations. In some example embodiments, the node managers 405, 415, 420 sync with the cluster master 410 after accepting file tasks, completing file tasks, rejecting file tasks, failing to complete accepted file tasks, and tracking the health of the peer database instance.

In some example embodiments, the cluster's state information ("RestoreClusterState") is configured as follows, where double forward slashes ("//") denotes comments:

```
::::::CODE BEGIN::::::
ClusterState {
  <clusterdata> : { //node membership data, reported by each node to the
  cluster master and/or requested from peer database node API.
    'Node1' : [shard1]
    'Node2' : [shard2]
    <node1> : {
      'Node Health' : [ ] //notifies cluster master of node termination
      'Files Done' : [ ], //files successfully restored
      'Files Pending' : [ ] //files accepted from queue
      'Files Rejected' : [ ] //files rejected by node manager
      ....
    },
    <node2>: ....
  }
::::::CODE END::::::
```

In some example embodiments, upon a change in cluster state or restart, the cluster master re-queues the 'Files Pending' to the appropriate node manager. Further, the 'Node Health' field tracks the health of a given node (e.g., the health of the peer database node/instance, health of the streaming restore node, health of the machine running the node). In some example embodiments, the node managers on each node periodically poll the peer database instances and sync the responses to 'Node Health'.

In some example embodiments, the cluster state data is stored with the cluster master (e.g., in cluster master 410). As illustrated in the example of FIG. 4, cluster state data 430 is stored in an external storage device 425 that is separate from the cluster of the nodes 1-3 (e.g., a separate VM, separate physical machine, remote network connected storage), such that if all the machines hosting nodes 1-3 malfunction, the external storage device 425 is not affected, according to some example embodiments. As illustrated, the cluster state data 430 can include state data for the restore job managed by cluster master 410 and other restore jobs, as discussed in further detail below. Further, according to some example embodiments, the cluster state data 430 can be replicated amongst the nodes 1-3 (replicated across the nodes using a peer database instances on each node). In this way, upon the cluster 400 being reconfigured, a restore prematurely terminating, or other interruptions, the cluster 400 can begin the restore job(s) using the state data 430 as checkpoint data, as discussed in further detail below with reference to FIG. 9.

In some example embodiments, node health is managed via a heartbeat scheme in which the node managers are to periodically check-in with the cluster master (e.g., via 'Node Health' sync updates). If a given node manager fails to check-in, then the cluster master determines that an issue on the node has occurred (e.g., the peer database instance malfunctioned, the cluster master malfunctioned, the physical machine running the node lost power, etc.), and may take responsive requeue operations as discussed in further detail with reference to FIG. 8 below.

Figure 5A:
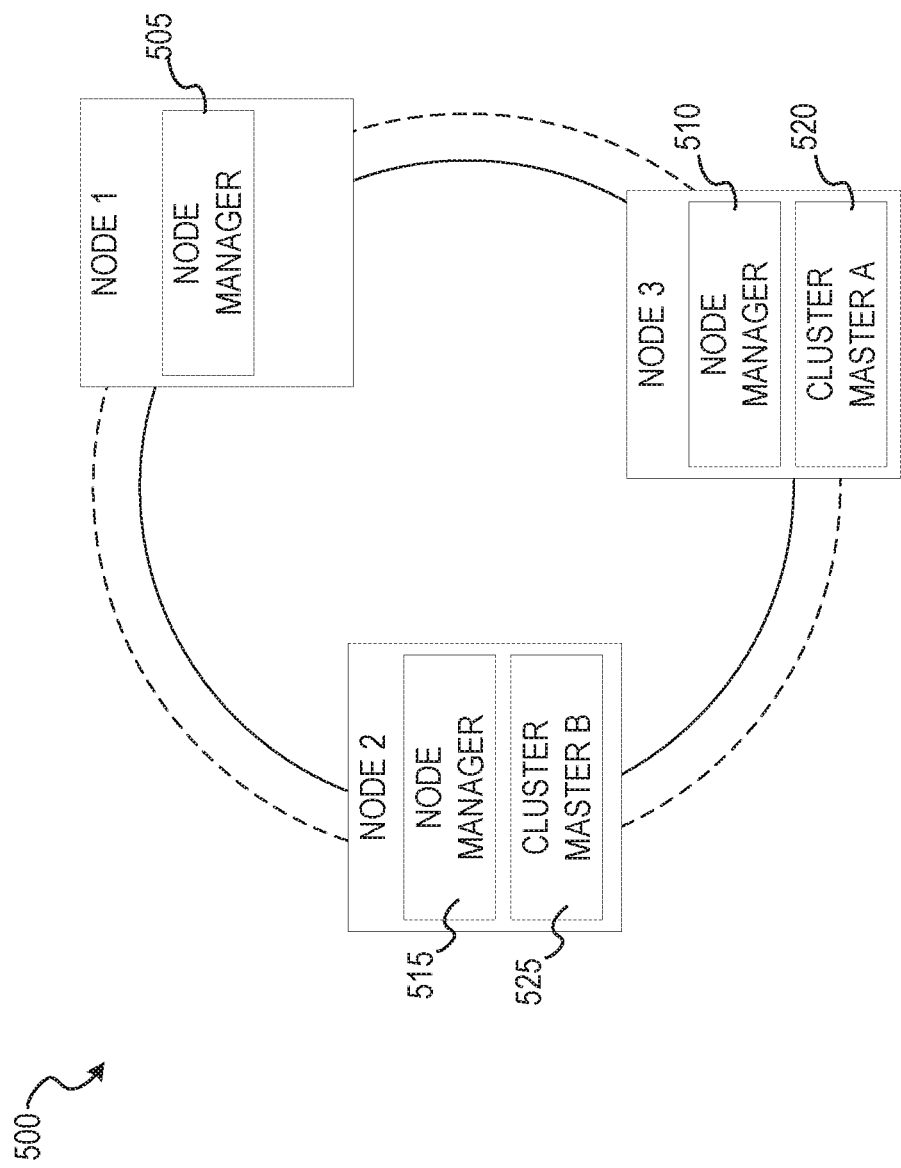
FIG. 5A shows an example cluster performing simultaneous streaming restore operations, according to some example embodiments.

FIG. 5A shows an example cluster 500 performing two simultaneous streaming restore jobs, according to some example embodiments. In the example of FIG. 5A, the first restore job (denoted by a solid ring connecting nodes 1-3) restores a first keyspace of the distributed decentralized database running on the cluster 500, and the second restore job (denoted by the dotted ring connecting nodes 1-3) restores a second, different keyspace running on the cluster 500. The multiple parallel restore jobs place a dynamic, fast-changing load burden on the respective nodes. The load may also be affected by conditions external to the cluster 500. For example, the cluster 500 may be a production cluster that provides network services over the Internet, as further discussed below with reference to FIG. 5C.

Each restore job is managed by a different cluster master, according to some example embodiments. In particular, upon a first restore job being initiated, node 3 is elected as the cluster master for that restore job, as indicated by cluster master A 520. Then, while the first restore job is processing, the second restore job is initiated and node 2 is elected as the cluster master for the second restore job, as indicated by cluster master B 525. While the first and second restore jobs are processing, each of the node managers may receive file tasks from either of the cluster masters. For example, node manager 505 may receive a file task request from cluster master A 520 and another file task request from cluster master B 525. In each case, the node manager 505 can accept or reject the file task request by determining whether computational resources on that node are available (e.g., have not surpassed the threshold).

Figure 5B:
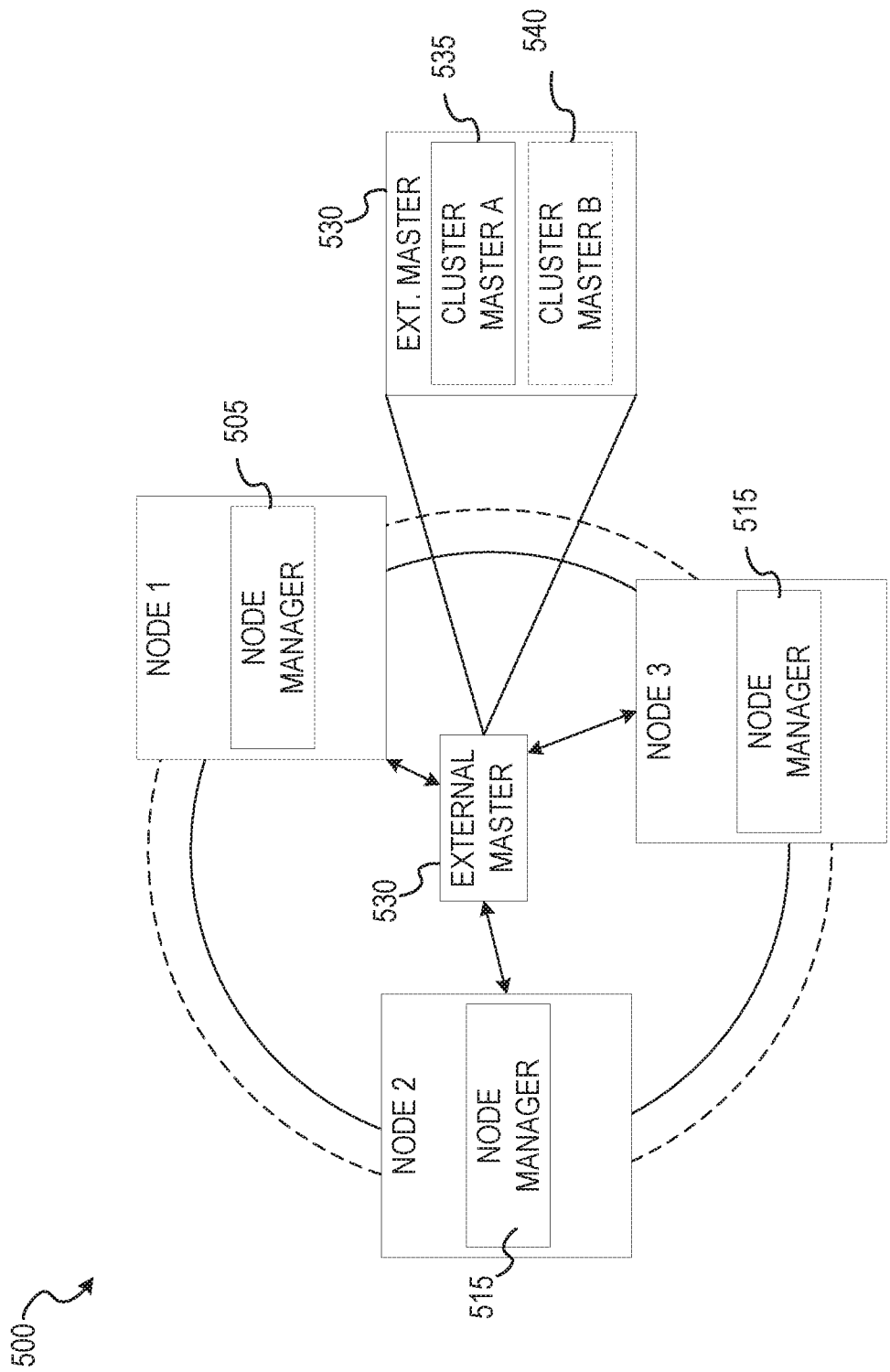
FIG. 5B shows the example cluster performing a restore operation with an external cluster master, according to some example embodiments.

FIG. 5B shows the example cluster 500 performing a restore job with an external cluster master 530, according to some example embodiments. In the example of FIG. 5B, the external cluster master 530 is an external network component (e.g., external server, external virtual machine) separate from nodes 1-3. For example, nodes 1-3 may be run on separate physical machines, and the external cluster master 530 may be on a different physical machine such that if any of the nodes 1-3 go down (e.g., a virtual machine running node 1 terminates, the physical machine running node 1 loses power) the external cluster master 530 is not affected.

According to some example embodiments, upon a first restore job being initiated, no node election occurs and instead cluster master A 535 is instantiated on the external cluster master 530, as illustrated in the close-up version of external cluster master 530 on the right side of FIG. 5B. Then, while the first restore job is processing, the second restore job is initiated and the cluster master B 540 is initiated on the external cluster master 530. As in FIG. 5A, while the first and second restore jobs are processing (indicated by the solid and dotted rings connecting the nodes 1-3), each of the node managers may receive file tasks from either of the cluster masters. For example, node manager 505 may receive a file task request from cluster master A 535 and another file task request from cluster master B 540. In each case, the node manager 505 can accept or reject the file task request by determining whether computational resources on that node are available.

Figure 5C:
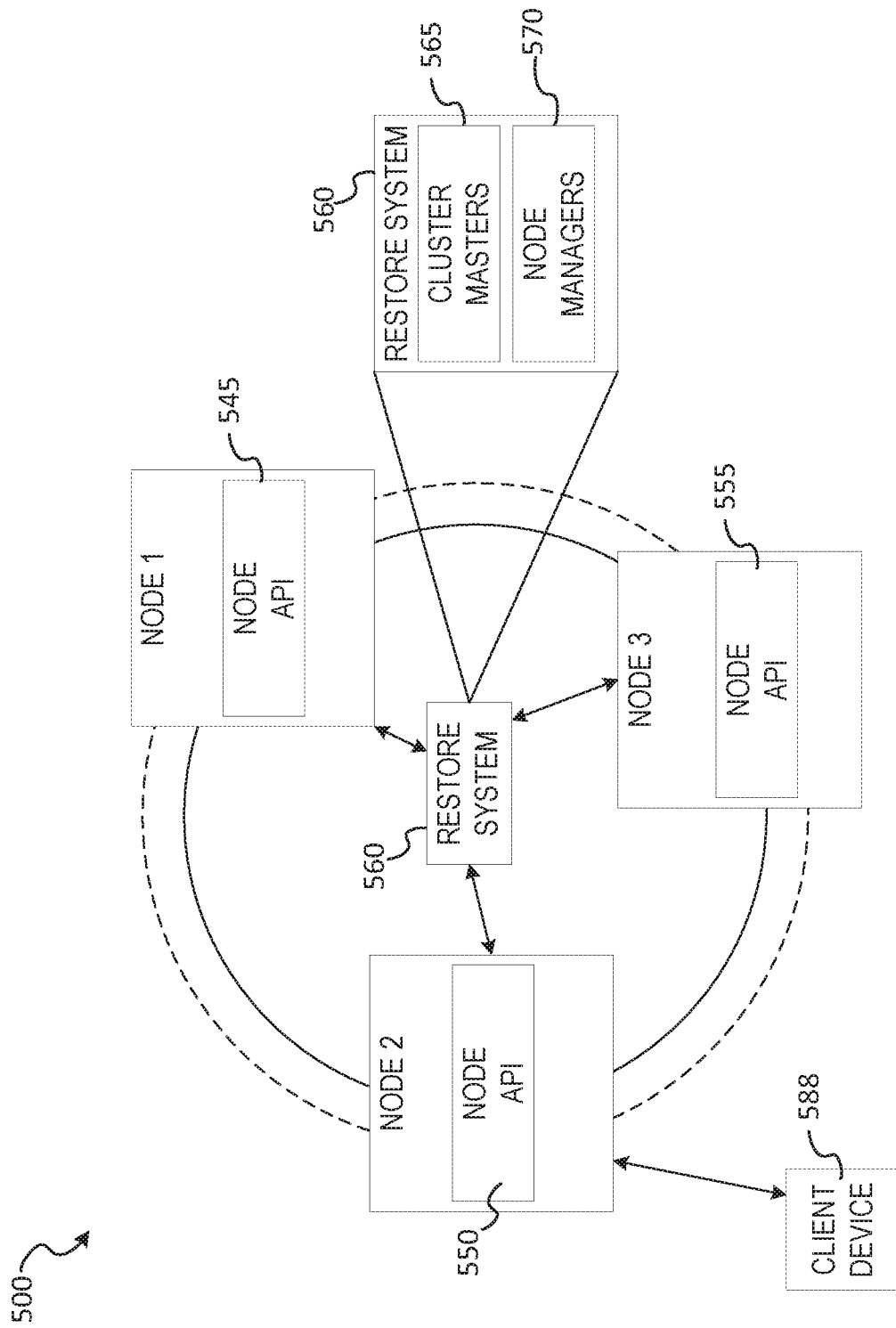
FIG. 5C shows the example cluster performing a restore operation with an external restore system having node managers and cluster masters, according to some example embodiments.

FIG. 5C shows the example cluster 500 performing a restore job with an external restore system 560 that hosts the node managers 570 and cluster masters 565, according to some example embodiments. In the example of FIG. 5C, the external restore system 560 is an external network component (e.g., external server, external virtual machine) separate from nodes 1-3. For example, nodes 1-3 may be run on separate physical machines, and the external restore system 560 may be on a different physical machine such that if any of the nodes 1-3 go down (e.g., a virtual machine running node 1 terminates, the physical machine running node 1 loses power) the external restore system 560 is not affected.

According to some example embodiments, upon a first restore job being initiated, no node election occurs and instead cluster master A is instantiated in cluster masters 565 (e.g., different instances of cluster masters 565 grouped together as one reference element) on the restore system 560, as illustrated in the close-up version of external restore system 560 on the right side of FIG. 5C. Further, the node managers for each of the nodes are hosted in node managers 570 in the external restore system 560 (e.g., different instances of node managers, one per node). Each node manager of the node managers 570 can interface with a target node via node application programming interfaces (APIs) 545, 550, 555. For example, a first node manager that manages local reasoning for node 1 in node managers 570 can accept or reject tasks for node 1 based on the computational usage resource levels of node 1 (e.g., disk usage, processor usage) and peer node health data supplied by node API of 545.

Then, while the first restore job is processing, a second restore job is initiated and a cluster master B is initiated in the cluster masters 565 on the external restore system 560. Further, while the first and second restore jobs are processing (indicated by the solid and dotted rings connecting the nodes 1-3), each of the node managers may receive file tasks from either of the cluster masters. For example, node manager for node 1 (i.e., a node manager instance operating in node managers 570) may receive a file restore task from cluster master A (for the first restore job) and another file restore task from cluster master B.

External factors can further create a dynamic load environment for the cluster 500. For example, assume the cluster 500 is a production cluster that provides network services to applications and a client device 588 has issued requested data from node 2 (e.g., queried a Cassandra node operating on node 2) while two restore jobs are being performed on the cluster 500. In this complex case, overloading of the cluster 500 is readily handled by local reasoning applied by node managers that apply local load analysis at the node-level (e.g., shard-level).

Figure 6:
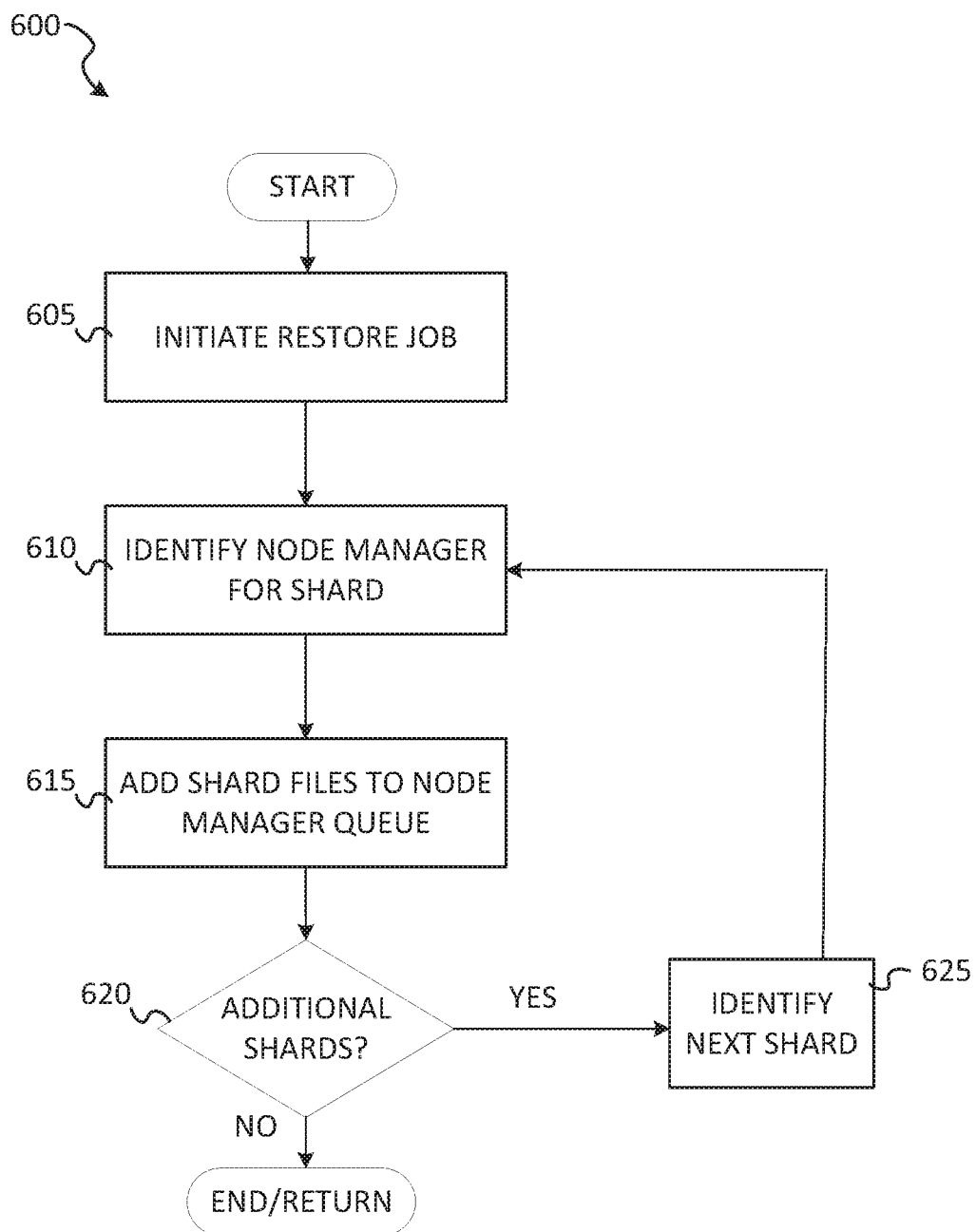
FIG. 6 shows a flow diagram of a method for performing a distributed streaming restore, according to some example embodiments.

FIG. 6 shows a flow diagram of a method 600 for performing a distributed streaming restore, according to some example embodiments. At operation 605, a restore job is initiated. For example, server 160 (FIG. 1) can initiate a restore job for a cluster managing a distributed decentralized database (e.g., NoSQL, Cassandra). In some example embodiments, in response to a restore job being initiated, the streaming restore instances undergo an election process that elects one of the nodes as a cluster master for that restore job. In some example embodiments, at operation 605 the cluster master analyzes whether there is existing cluster state data for a previously incomplete restore job, as discussed in further detail below with reference to FIG. 9.

Continuing, at operation 610, the cluster master identifies a node manager that manages a shard. For example, after the cluster master is elected, the cluster master identifies a shard to be restored and further identifies the node that manages the shard. In some example embodiments, the node that manages the shard is any node that manages the shard (e.g., any one of the node replicas). In some example embodiments, the cluster master determines which of the replica nodes has the least number of items in its queue and selects the replica with the least full queue as the node that manages the shard. Which node manages which shard may change in response to dynamic network conditions. For example, if a node goes down, another node may take its place, or if the cluster is reconfigured, which node manages which shard may change. The cluster master can track node membership, and further track which shard a given node has access to in the cluster state data.

At operation 615, the cluster master adds restore file tasks to the queue of the node manager of the node identified at operation 610. For example, with reference to FIG. 3, if the cluster master 310 determines that node manager 305 manages the given shard, then restore file tasks for that shard are added to queue 320. Whereas, if the cluster master 310 determines that node 2 manages the shard, then file restore tasks for that shard are added to queue 325 (the queue for node 2), which may be located in the cluster master 310, node 2, or both (not depicted in FIG. 3). At operation 620, the cluster master determines whether there are additional shards to be restored. If there are additional shards to be restored, then at operation 625 the cluster master identifies the next shard and the method 600 loops to operation 610, in which the node manager is identified and the shard files are added to the node manager queue. If there are no additional shards, the method 600 terminates or otherwise returns.

Figure 7:
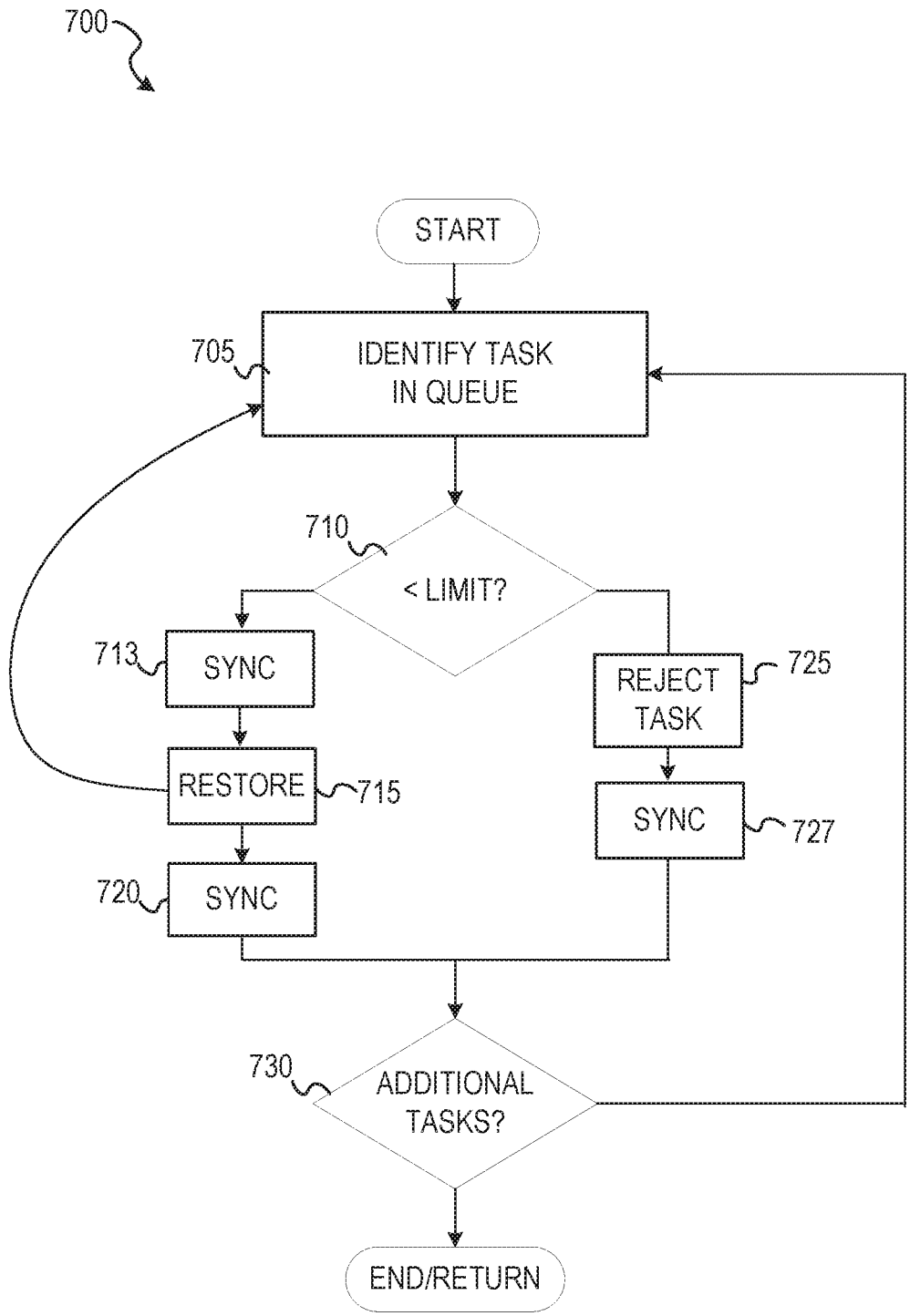
FIG. 7 shows a flow diagram of a method for managing file tasks using a node manager, according to some example embodiments.

FIG. 7 shows a flow diagram of a method 700 for managing file tasks using a node manager, according to some example embodiments. The method 700 may be triggered by operation 615 of FIG. 6, in which file restore tasks were added to a node manager's queue. In some example embodiments, the method 700 is not triggered by items being added to the queue, but rather the node manager initiates method 700 periodically or upon computational resource levels going below a limit (e.g., processor, disk, memory below 20% of maximum level).

At operation 705, the node manager identifies a file restore task in the node manager's queue. The file restore task specifies one or more sets of a data of a given shard to be restored per the cluster master. At operation 710, the node manager determines whether the node's resources are under the node task limit. The cluster master delegates analysis of the node's computational usage levels to the node manager of the given node and, in some example embodiments, does not have access to the node's computational usage levels.

The node task limit can be specified (e.g., pre-specified, stored as setting/parameter) as one or more maximum levels for one or more usage levels of computational resources of the node (e.g., processor usage, disk usage, memory usage, network usage), according to different implementations. For example, at operation 710 if the node manager determines that 50% or more of the node's disk is being used, then the task is rejected at operation 725 and the node manager notifies the cluster master of the rejected file tasks at operation 727 (e.g., 'Files Rejected', in RestoreClusterState information).

Whereas at operation 710, if 49% or less of the node's disk is being used, then the file restore task is accepted and operations 713, 715, and 720 are performed, as discussed in further detail below.

In some example embodiments, the node task limit is configured as Boolean logic gate (e.g., a Boolean OR) that depends on multiple computational levels and their respective limits. For example, at operation 710, if the node manager determines that if (1) 50% or more of the node's memory is being used, OR if (2) 70% of the node's processor is being used, then the task is rejected at operation 725. In contrast, if at operation 710 the node manager determines that the processor usage is below 70% and further determines that memory usage is below 50%, then the task is accepted and operations 713, 715, and 720 are performed.

In some example embodiments, the node task limit is at the cluster level. For example, if the node task limit is set to 10 GB max on disk, then that limit applies to each node, and the node manager of the node applies local reasoning using the cluster-level specified limit. If the node task limit is decreased (e.g., from 10 GB to 3 GB max), then each of the node managers will more aggressively reject tasks in queue. Further, in some example embodiments, the node task limit is set per node: node 1 may have a 10 GB disk limit, node 2 may have a 5 GB disk limit, and so on.

At operation 713, after the node manager accepts the file tasks, it syncs with the node manager to record state (e.g., 'Files Pending'). At operation 715, the node manager restores the files per the restore file task in the queue. For example, at operation 715 the node manager may first copy the file task from the queue and then initiate SSTableLoader to copy the files specified in the task from disk to memory. At operation 720, after performing the file restore tasks, the node manager syncs with the cluster master to record the completion state (e.g., 'Files Done').

At operation 730, the node manager determines whether there are additional tasks in the queue. If there are additional tasks in the queue, then the method 700 loops to 705 in which the tasks are identified and accepted or rejected as discussed above. In some example embodiments, the node manager is configured to perform multiple file restore tasks from the queue if the node task limit (e.g., operation 710) is not reached. For example, while the restore tasks are performed at operation 715, the node manager may initiate operation 715 and determine whether there are any more file tasks to be performed at operation 705. In this way, the node manager can perform multiple tasks while staying under the limit for that node. Thus, in a given cluster of nodes, one or more restore jobs may be performed, and in each restore job, multiple file restore tasks are performed without overloading any node in the cluster.

Figure 8:
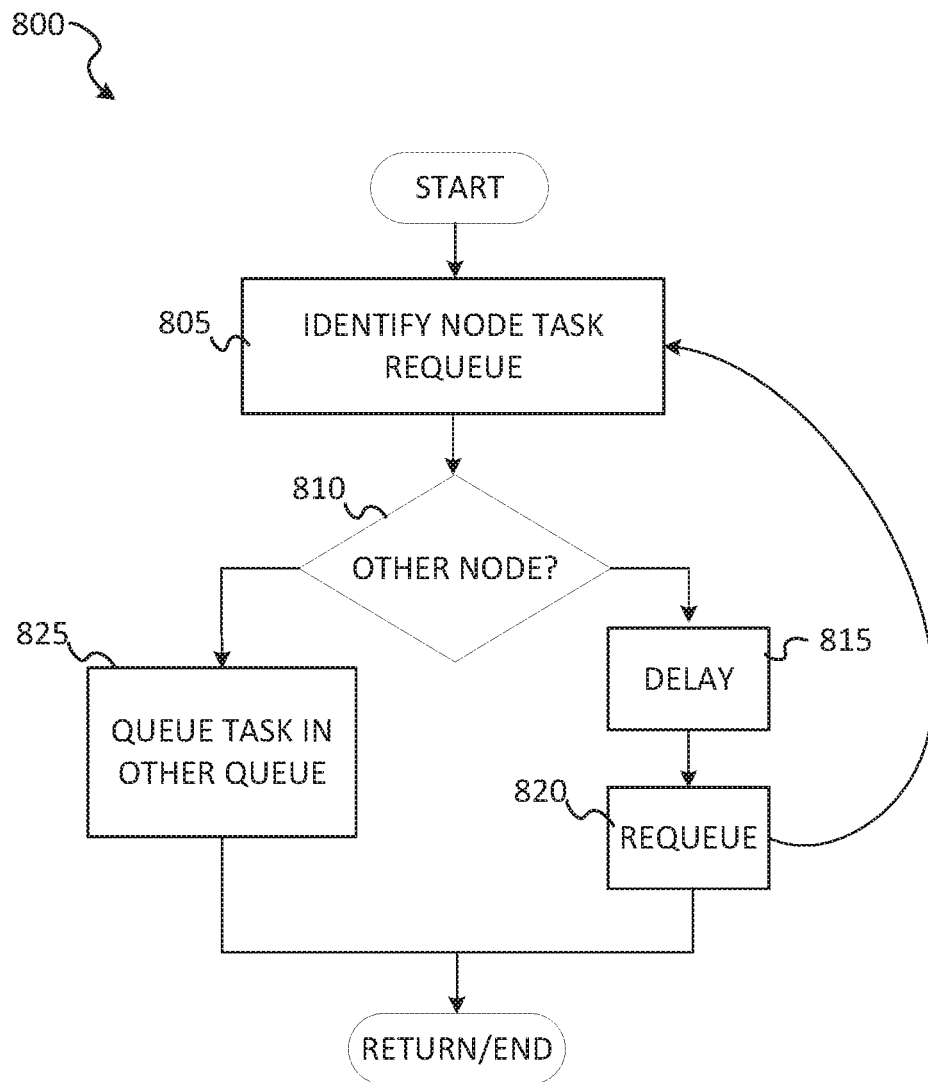
FIG. 8 shows an example flow diagram of a method for managing requeues in a distributed streaming restore system, according to some example embodiments.

FIG. 8 shows an example flow diagram of a method 800 for managing requeues in a distributed streaming restore system, according to some example embodiments. Requeues occur when a node manager rejects or cannot perform file restore tasks. For example, method 800 may be triggered by operation 725 in FIG. 7 in which a node manager rejected a file restore task. Further, method 800 may be triggered in response to one or more nodes terminating or the cluster being reorganized.

At operation 805, the cluster master identifies a node master requeue operation. For example, the cluster master receives notification that one or more file restore tasks are rejected and identifies the rejected file restore tasks at operation 805. As an additional example, one of the nodes may prematurely terminate and the node manager of the node may sync to the cluster master that the node is non-responsive (e.g., via 'Node Health' syncs). In response to the node being non-responsive, the cluster master determines which file restore tasks the node was performing via the cluster state information (e.g., 'Files Pending'). At operation 810, the cluster master determines whether other nodes can perform the file restore tasks. For example, at operation 810 the cluster master identifies a replica of the node that malfunctioned. If the cluster master determines that another node can process the file restore tasks, then the cluster master adds the file restore tasks to the queue of the other node at operation 825.

In some example embodiments, another node may not have access to the data to be restored per the file restore task. In this case, at operation 810 the cluster master determines that there are no other nodes available. In response, the cluster master delays the file restore tasks for a period of time (e.g., 1 minute, 1 hour) at operation 815 and attempts to requeue the file restore tasks in the queue of the original node at operation 820. If the node is re-activated ("brought back up"), or otherwise again becomes responsive, the node manager can process the items requeued at operation 820 (e.g., via method 700, FIG. 7).

In some example embodiments, a node is assigned exclusive access to a set of data to be restored (e.g., the node has a lock on the data) and the cluster master cannot queue but must continually delay until the node is available. For example, if a node having exclusive access on certain data is not available to process the data, then the cluster master determines that there are no other nodes, and loops between delays, requeues, and identifying the required data until the node is available, as indicated by the arrow from operation 820 to operation 805, according to some example embodiments.

Figure 9:
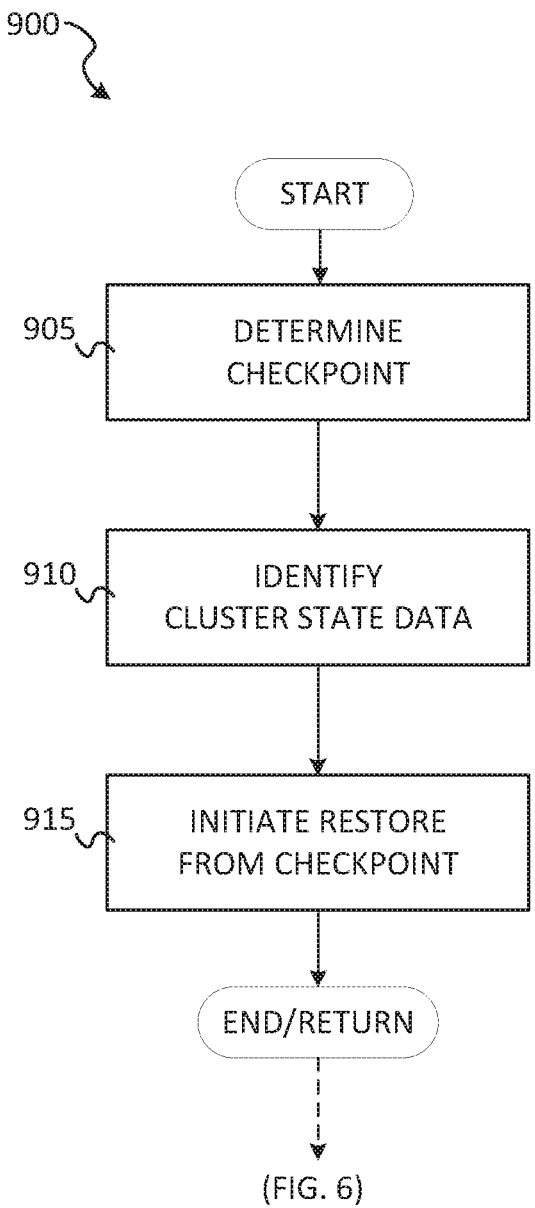
FIG. 9 shows a flow diagram for a method for restoring from a checkpoint in a distributed streaming database system, according to some example embodiments.

FIG. 9 shows a flow diagram for a method 900 for restoring from a checkpoint in a streaming restore distributed database system, according to some example embodiments. As previously discussed with reference to FIG. 4, the cluster state data records the state of the restore job through sync operations from the node managers. If the restore job does not complete, for example, the node cluster terminates or malfunctions, the cluster state data is used as a checkpoint to complete the restore job using method 900.

At operation 905, the cluster manager determines that a checkpoint exists. For example, upon the cluster prematurely terminating and then coming back online, node election of the cluster master occurs, and the cluster manager checks whether there is existing state data for incomplete restore jobs.

At operation 910, the cluster master identifies cluster state data for a specific restore job. The cluster state data records which files of shards were restored and which were being restored upon the last restore job interruption (e.g., the 'Files Pending' item indicates incomplete file restore tasks).

At operation 915, the cluster master initiates the restore from the checkpoint using the cluster state data. The method 900 can then end or return, and method 600 of FIG. 6 can proceed with the partially complete restore job.

Figure 10:
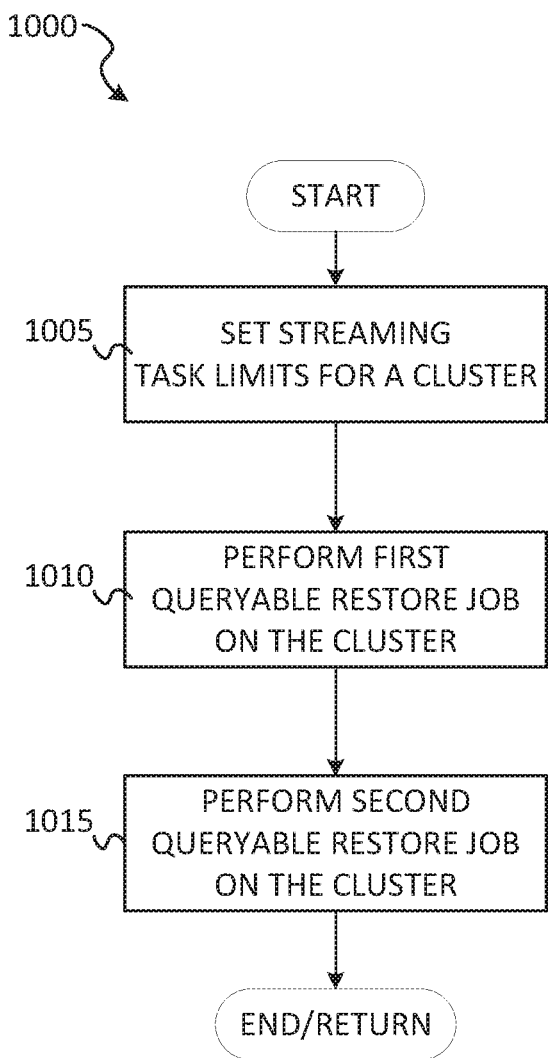
FIG. 10 shows a flow diagram for a method performing multiple tasks on a cluster, according to some example embodiments.

FIG. 10 shows a flow diagram for a method 1000 performing multiple tasks on a cluster, according to some example embodiments. At operation 1005, the node managers set the streaming task limit for the nodes. For example, an administrator of the streaming distributed database system can specify each node of the cluster should not use more than 10 GB of disk for performing tasks, such as restore tasks. As discussed above, the streaming task limit can be applied at the node-level or shard-level using local reasoning by each node manager.

At operation 1010, a first cluster manager performs a first queryable restore job on the cluster with streaming limited by the streaming task limit of operation 1005. A queryable restore is a restore operation in which only specified items, but not the entire shard, column family, table, or keyspace, are to be restored. This enables smaller items to be restored, without having to restore the entire dataset. The specified items are set as parameters called in as a query in the restore command. Upon receiving the command, the column master can identify the node manager that manages or otherwise has access to data, and then filter out the rows that do not match the query, then only restore those items. An example first queryable restore instruction for the first queryable restore job includes: "RESTORE_column1, _column2 FROM cf1 WHERE _column2=4". In some example embodiments, the queryable restore instruction is inserted in the queue and the node manager that receives the queryable restore instruction performs the filtering and restoring of the data. While the queryable restore instruction adds complexity and may require more processing power (thereby increasing the load), the streaming task system can perform the tasks safely without overloading the cluster.

At operation 1015, a second cluster manager performs a second queryable restore job on the cluster with streaming limited by the streaming task limit of operation 1005. An example second queryable restore instruction for the first queryable restore job includes: "RESTORE_column4, _column7 FROM cf1 WHERE _column4=1". The second cluster master can perform the second queryable restore on the same cluster of nodes while the first queryable restore job is being performed. In contrast to past approaches, the multiple tasks can be issued to the cluster and the cluster streams the task using queues, limits, and delays at the node level to ensure the cluster is not overloaded.

Although restores are discussed in the examples above, it is appreciated by those of ordinary skill in decentralized distributed databases that the streaming task system can be adapted for other tasks to be performed by a cluster of nodes in parallel.

Figure 11:
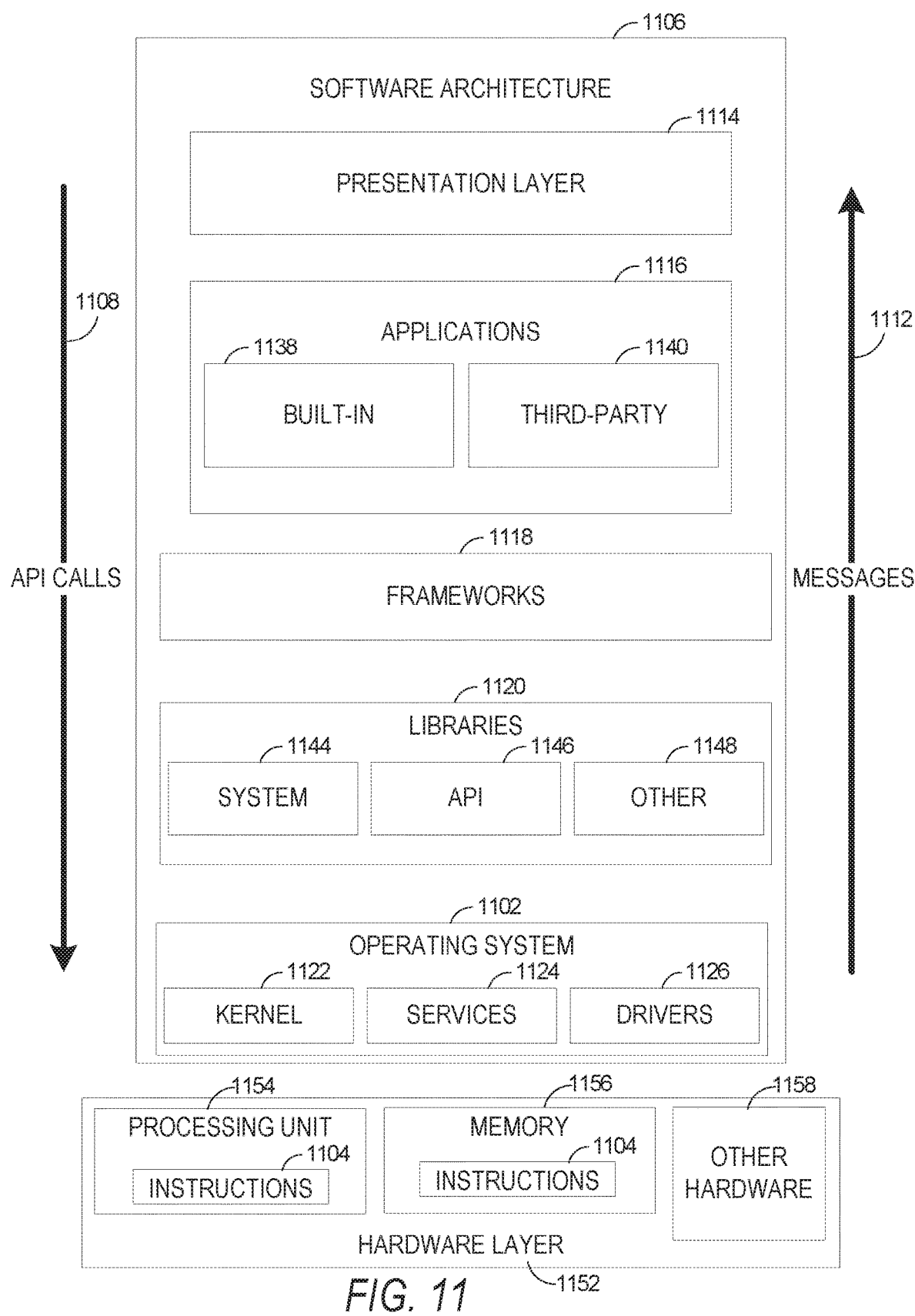
FIG. 11 is a block diagram illustrating a representative software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture, and it will be appreciated that many other architectures may be implemented to facilitate the functionality described herein. The software architecture 1106 may execute on hardware such as a machine 1200 of FIG. 12 that includes, among other things, processors, memory, and I/O components. A representative hardware layer 1152 is illustrated and can represent, for example, the machine 1200 of FIG. 12. The representative hardware layer 1152 includes a processing unit 1154 having associated executable instructions 1104. The executable instructions 1104 represent the executable instructions of the software architecture 1106, including implementation of the methods, components, and so forth described herein. The hardware layer 1152 also includes a memory/storage 1156, which also has the executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response in the form of messages 1112. The layers illustrated are representative in nature and not all software architectures have all layers. For example, some mobile or special-purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than by interfacing directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. The third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as the operating system 1102) to facilitate functionality described herein.

The applications 1116 may use built-in operating system functions (e.g., kernel 1122, services 1124, and/or drivers 1126), libraries 1120, and frameworks/middleware 1118 to create user interfaces to interact with users of the system. Alternatively, or additionally, in some systems, interactions with a user may occur through a presentation layer, such as the presentation layer 1114. In these systems, the application/component "logic" can be separated from the aspects of the application/component that interact with a user.

Figure 12:
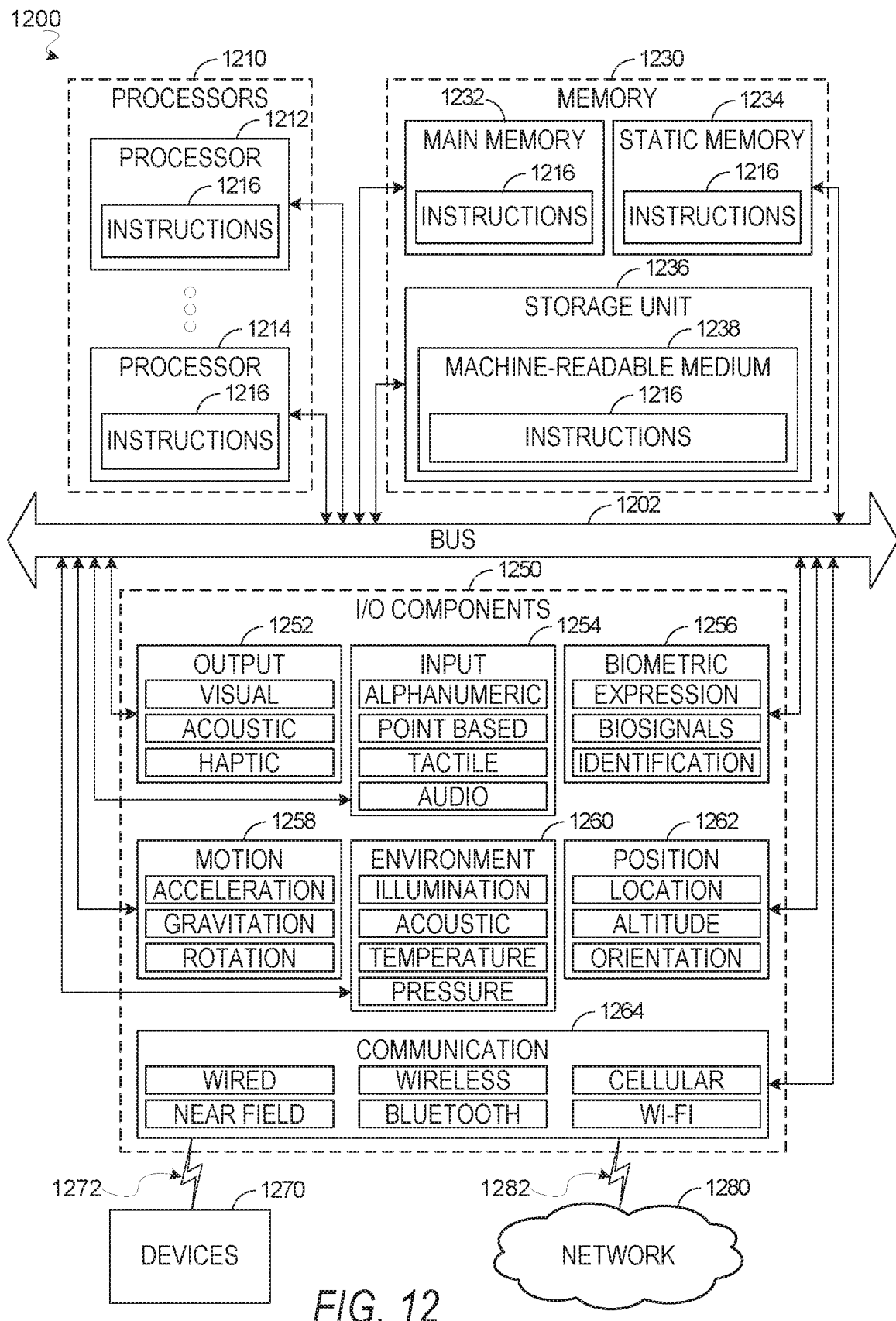
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. As such, the instructions 1216 may be used to implement modules or components described herein. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. The memory/storage 1230 may include a main memory 1232, static memory 1234, and a storage unit 1236, both accessible to the processors 1210 such as via the bus 1202. The storage unit 1236 and main memory 1232 store the instructions 1216 embodying any one or more of the methodologies or functions described herein. The instructions 1216 may also reside, completely or partially, within the static memory 1234, within the storage unit 1236 (e.g., on machine readable-medium 1238), within at least one of the processors 1210 (e.g., within the processor cache memory accessible to processors 1212 or 1214), or any suitable combination thereof, during execution thereof by the machine 1200. Accordingly, the main memory 1232, static memory 1234, the storage unit 1236, and the memory of the processors 1210 are examples of machine-readable media.

The I/O components 1250 may include a wide variety of components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environment components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environment components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or other suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1216 for execution by the machine 1200, and includes digital or analog communications signals or other intangible media to facilitate communication of such instructions 1216. Instructions 1216 may be transmitted or received over the network 1280 using a transmission medium via a network interface device and using any one of a number of well-known transfer protocols.

"CLIENT DEVICE" in this context refers to any machine 1200 that interfaces to a network 1280 to obtain resources from one or more server systems or other client devices (e.g., client device 588). A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1280.

"COMMUNICATIONS NETWORK" in this context refers to one or more portions of a network 1280 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1280 may include a wireless or cellular network and the coupling 1282 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 1216 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions 1216 (e.g., code) for execution by a machine 1200, such that the instructions 1216, when executed by one or more processors 1210 of the machine 1200, cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1212 or a group of processors 1210) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1200) uniquely tailored to perform the configured functions and are no longer general-purpose processors 1210.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1212 configured by software to become a special-purpose processor, the general-purpose processor 1212 may be configured as respectively different special-purpose processors (e.g., comprising different hardware components) at different times. Software accordingly configures a particular processor 1212 or processors 1210, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1210 that are temporarily configured (e.g., by software) or permanently configured to perform the relevant operations. Whether temporarily or permanently configured, such processors 1210 may constitute processor-implemented components that operate to perform one or more operations or functions described herein. As used herein, "processor-implemented component" refers to a hardware component implemented using one or more processors 1210. Similarly, the methods described herein may be at least partially processor-implemented, with a particular processor 1212 or processors 1210 being an example of hardware. For example, at least some of the operations of a method may be performed by one or more processors 1210 or processor-implemented components. Moreover, the one or more processors 1210 may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network 1280 (e.g., the Internet) and via one or more appropriate interfaces (e.g., an API). The performance of certain of the operations may be distributed among the processors 1210, not only residing within a single machine 1200, but deployed across a number of machines 1200. In some example embodiments, the processors 1210 or processor-implemented components may be located in a single geographic location (e.g., within a home environment, an office environment, or a server farm). In other example embodiments, the processors 1210 or processor-implemented components may be distributed across a number of geographic locations.

"PROCESSOR" in this context refers to any circuit or virtual circuit (a physical circuit emulated by logic executing on an actual processor 1212) that manipulates data values according to control signals (e.g., "commands," "op codes," "machine code," etc.) and which produces corresponding output signals that are applied to operate a machine 1200. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1210 may further be a multi-core processor 1210 having two or more independent processors 1212, 1214 (sometimes referred to as "cores") that may execute instructions 1216 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   identifying instructions to perform a first restore job and a second restore job;
   performing the first restore job on a first distributed dataset that is distributed across a cluster of peer nodes of a distributed database, each peer node comprising a node manager that regulates restore tasks based on one or more computational resource usage levels of the peer node; and
   performing the second restore job on a second distributed dataset that is distributed across the cluster of peer nodes, the first and second restore jobs being performed in parallel by the cluster of peer nodes and at least one node manager of one of the peer nodes having tasks from the first restore job and the second restore job.

2. The method of claim 1, further comprising:
activating a first cluster master for the first restore job, the first cluster master being interfaced with node managers in the cluster of peer nodes; and
activating a second cluster master for the second restore job, the second cluster master being interfaced with the node managers in the cluster of peer nodes.

3. The method of claim 2, wherein the first cluster master determines which of the peer nodes manage files in the first distributed dataset to be restored per the first restore job, and the second cluster master determines which of the peer nodes manage files in the second distributed dataset to be restored per the second restore job.

4. The method of claim 3, further comprising:
adding, to a queue of the at least one node manager, by the first cluster master, a first file restore task of the first restore job; and
adding, to the queue of the at least one node manager, by the second cluster master, a second file restore task of the second restore job.

5. The method of claim 4, further comprising:
transmitting, to the first cluster master, by the at least one node manager, a response to the first file restore task, the response generated by the at least one node manager based the one or more computational resource usage levels of the peer node.

6. The method of claim 5, further comprising:
transmitting, to the second cluster master, by the at least one node manager while performing the first file restore task, an additional response to the second file restore task, the additional response rejecting the second file restore task based on the one or more computational resource usage levels of the peer node.

7. The method of claim 6, further comprising:
storing, by the first cluster master, the response in first cluster state data for the first restore job; and
storing, by the second cluster master, the additional response in second cluster state data for the second restore job.

8. The method of claim 1, wherein the first restore job and the second restore job performed in parallel by the cluster of peer nodes are queryable restore jobs with different queries.

9. The method of claim 1, wherein the first and second distributed datasets are part of a same keyspace.

10. The method of claim 9, wherein the first restore job comprises a first query for restoring one or more columns of the keyspace, the first distributed dataset being the one or more columns of the keyspace; and
wherein the second restore job comprises a second query for restoring one or
one or more different columns of the keyspace, the second distributed dataset being the one or more columns of the keyspace.

11. The method of claim 10, further comprising:
filtering, by the at least one node manager, a portion of the keyspace per the first query; and
filtering, by the at least one node manager, another portion of the keyspace per the second query.

12. The method of claim 1, wherein the node manager regulates restore tasks by accepting tasks based on the one or more computational resource usage levels not exceeding a pre-specified threshold.

13. The method of claim 12, wherein the pre-specified threshold is set at a cluster-level and node managers of the peer nodes evaluate the pre-specified threshold at a node level.

14. The method of claim 12, wherein the one or more computational resource usage levels is a disk usage level, and the pre-specified threshold is a maximum disk usage level.

15. The method of claim 12, wherein the one or more computational resource usage levels comprises: a processor usage level and a disk usage level, and wherein the pre-specified threshold specifies limits for at least one of: the processor usage level or the disk usage level.

16. The method of claim 1, wherein the distributed database is a NoSQL database.

17. A system comprising:
one or more processors of a machine; and
a memory storing instructions that, when executed by the one or more processors, cause the one or more processors to perform operations comprising:
identifying instructions to perform a first restore job and a second restore job;
performing the first restore job on a first distributed dataset that is distributed across a cluster of peer nodes of a distributed database, each peer node comprising a node manager that regulates restore tasks based on one or more computational resource usage levels of the peer node; and
performing the second restore job on a second distributed dataset that is distributed across the cluster of peer nodes, the first and second restore jobs being performed in parallel by the cluster of peer nodes and at least one node manager of one of the peer nodes having tasks from the first restore job and the second restore job.

18. The system of claim 17, wherein the first and second distributed datasets are part of a same keyspace.

19. The system of claim 18, wherein the first restore job comprises a first query for restoring one or more columns of the keyspace, the first distributed dataset being the one or more columns of the keyspace; and
wherein the second restore job comprises a second query for restoring one or
one or more different columns of the keyspace, the second distributed dataset being the one or more columns of the keyspace.

20. A machine-readable storage device embodying instructions that, when executed by a machine, cause the machine to perform operations comprising:
identifying instructions to perform a first restore job and a second restore job;
performing the first restore job on a first distributed dataset that is distributed across a cluster of peer nodes of a distributed database, each peer node comprising a node manager that regulates restore tasks based on one or more computational resource usage levels of the peer node; and
performing the second restore job on a second distributed dataset that is distributed across the cluster of peer nodes, the first and second restore jobs being performed in parallel by the cluster of peer nodes and at least one node manager of one of the peer nodes having tasks from the first restore job and the second restore job.

* * * * *

UNITED STATES PATENT AND TRADEMARK OFFICE
CERTIFICATE OF CORRECTION

PATENT NO. : 11,086,723 B2
APPLICATION NO. : 16/263413
DATED : August 10, 2021
INVENTOR(S) : Sharma et al.

Page 1 of 1

It is certified that error appears in the above-identified patent and that said Letters Patent is hereby corrected as shown below:

In the Specification

In Column 25, Line 19, delete ""RESTORE_column1," and insert --"RESTORE_column1,-- therefor In Column 25, Line 32, delete ""RESTORE_column4," and insert --"RESTORE_column4,-- therefor In the Claims In Column 33, Line 52, in Claim 10, after "restoring", delete "one or"

In Column 33, Line 53, in Claim 10, before "one or more", delete a linebreak

In Column 34, Line 43, in Claim 19, after "restoring", delete "one or"

In Column 34, Line 44, in Claim 19, before "one or more", delete a linebreak

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*